US009772925B2

(12) United States Patent
Miskelly et al.

(10) Patent No.: US 9,772,925 B2
(45) Date of Patent: Sep. 26, 2017

(54) STORAGE ACCESS DEBUGGING WITH DISASSEMBLY AND SYMBOL ENTRIES

(71) Applicant: Microsoft Technology Licensing, LLC, Redmond, WA (US)

(72) Inventors: Gregory Miskelly, Seattle, WA (US); Maciej Piotr Foks, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 161 days.

(21) Appl. No.: 14/922,503

(22) Filed: Oct. 26, 2015

(65) Prior Publication Data

US 2017/0116108 A1 Apr. 27, 2017

Related U.S. Application Data

(60) Provisional application No. 62/245,200, filed on Oct. 22, 2015.

(51) Int. Cl.
  G06F 9/44 (2006.01)
  G06F 11/36 (2006.01)
  G06F 9/45 (2006.01)

(52) U.S. Cl.
  CPC ............ *G06F 11/3624* (2013.01); *G06F 8/53* (2013.01); *G06F 11/362* (2013.01); *G06F 11/3636* (2013.01)

(58) Field of Classification Search
  CPC .................................................. G06F 11/3624
  USPC ........................................................ 717/124
  See application file for complete search history.

(56) References Cited

U.S. PATENT DOCUMENTS

| 5,644,709 | A |   | 7/1997  | Austin |
| 5,854,924 | A | * | 12/1998 | Rickel ................. G06F 11/3604 714/38.1 |
| 6,151,701 | A |   | 11/2000 | Humphreys et al. |
| 7,231,634 | B2 |  | 6/2007  | Harres |
| 7,322,027 | B2 |  | 1/2008  | Tousignant |
| 7,376,941 | B2 |  | 5/2008  | Allen |

(Continued)

OTHER PUBLICATIONS

Cristina Cifuentes, "Decompilation of Binary Programs", Jul. 1995, pp. 811-829.*

(Continued)

*Primary Examiner* — Wei Zhen
*Assistant Examiner* — Lanny Ung
(74) *Attorney, Agent, or Firm* — Ogilvie Law Firm

(57) ABSTRACT

Debugging without reliance on source code includes obtaining a disassembly of a portion of an executable code. The disassembly includes a sequence of assembly instructions including an instruction Y at which an exception or other event of interest occurred and at least five assembly instructions that precede Y. An assembly instruction X is located for which a mapping is known between a storage location accessed in instruction X and a symbolic name SYM_X for that storage location, where data flow and/or control flow leads from instruction X to instruction Y. A symbolic name SYM_Y that pertains to instruction Y is built from SYM_X while interpreting the assembly instructions between X and Y, and SYM_Y is reported to the user. Some variations include tools and techniques for locating the instruction X, and tools and techniques for determining a flow relationship between instruction X and instruction Y.

20 Claims, 5 Drawing Sheets

(56) References Cited

U.S. PATENT DOCUMENTS

| | | | |
|---|---|---|---|
| 8,060,869 | B1 | 11/2011 | Panchenko et al. |
| 8,510,596 | B1 | 8/2013 | Gupta et al. |
| 8,516,450 | B2 | 8/2013 | Narasimhan |
| 8,732,673 | B2 | 5/2014 | Finking et al. |
| 2004/0111713 | A1* | 6/2004 | Rioux .............. G06F 8/427 717/137 |
| 2007/0150879 | A1 | 6/2007 | Rangarajan et al. |
| 2009/0235054 | A1* | 9/2009 | Pan .................. G06F 8/53 712/208 |
| 2010/0106926 | A1 | 4/2010 | Kandasamy et al. |
| 2012/0144371 | A1 | 6/2012 | Patton |
| 2012/0159458 | A1 | 6/2012 | Levanoni et al. |
| 2012/0167057 | A1 | 6/2012 | Schmich et al. |
| 2014/0366007 | A1 | 12/2014 | Koltachev et al. |

OTHER PUBLICATIONS

Kumar Pranith et al., "Hybrid Analysis of Executables to Detect Security Vulnerabilities", Mar. 2009, pp. 1-24.*

Rugina, et al., "Symbolic Bounds Analysis of Pointers, Array Indices, and Accessed Memory Regions", In Journal of ACM Transactions on Programming Languages and Systems, vol. 27, No. 2, Mar. 2005, pp. 185-235.

Hovemeyer, et al., "Evaluating and Tuning a Static Analysis to Find Null Pointer Bugs", In Proceedings of 6th ACM SIGPLAN-SIGSOFT Workshop on Program Analysis for Software Tools and Engineering, Sep. 5, 2005, pp. 13-19.

Zister, et al., "Testing Static Analysis Tools using Exploitable Buffer Overflows from Open Source Code", In Proceedings of 12th ACM SIGSOFT Twelfth International Symposium on Foundations of Software Engineering, Oct. 31, 2004, pp. 97-106.

Giovanni Vigna, "Static Disassembly and Code Analysis", retrieved from <<https://www.cs.ucsb.edu/~vigna/publications/2007_vigna_malware.pdf>>, 2007, 25 pages.

Steve Hanov, "Static Analysis of Binary Executables", retrieved from <<http://stevehanov.ca/cs842_project.pdf>>, no later than Sep. 23, 2015, 9 pages.

"Debug the reference dll(without source code in solution)—CodeProject", retrieved from <<http://www.codeproject.com/Questions/287477/Debug-the-reference-dll-without-source-code-in-sol>>, Nov. 21, 2011, 5 pages.

"Decompiler", retrieved from <<https://en.wikipedia.org/wiki/Decompiler>>, Jul. 28, 2015, 7 pages.

"Exception handling", retrieved from <<https://en.wikipedia.org/wiki/Exception_handling>>, Sep. 7, 2015, 9 pages.

"ILSpy Debugger Preview—Eusebiu's blog", retrieved from <<http://community.sharpdevelop.net/blogs/marcueusebiu/archive/2011/04/12/ilspy-debugger-preview.aspx>>, May 7, 2011, 3 pages.

"ILSpy", retrieved from <<http://ilspy.net/>>, Jul. 13, 2015, 5 pages.

"Native Java Bytecode Debugging without Source Code >> Adversary Manifesto", retrieved from <<http://blog.crowdstrike.com/native-java-bytecode-debugging-without-source-code/>>, Feb. 12, 2014, 11 pages.

"Stepping through the precompiled assemblies with .NET Reflector", retrieved from <<http://www.infoq.com/news/2012/08/precompiled-net-reflector>>, 2012, 22 pages.

"disassembly—What's the difference between a disassembler, debugger and decompiler?", retrieved from <<http://reverseengineering.stackexchange.com/questions/4635/whats-the-difference-between-a-disassembler-debugger-and-decompiler>>, Jun. 18, 2014, 1 page.

"Something Better than .NET Reflector?", retrieved from <<http://stackoverflow.com/questions/2646707/something-better-than-net-reflector>>, Apr. 15, 2010, 4 pages.

Kinder, Johannes, "Static Analysis of x86 Executables", retrieved from <<http://tuprints.ulb.tu-darmstadt.de/2338/>>, 2010, 2 pages.

"Symbol table", retrieved from <<https://en.wikipedia.org/wiki/Symbol_table>>, Aug. 20, 2015, 5 pages.

"Symbolic computation", retrieved from <<https://en.wikipedia.org/wiki/Symbolic_computation>>, Sep. 19, 2015, 6 pages.

"Interpreter (computing)", retrieved from <<https://en.wikipedia.org/wiki/Interpreter_(computing)>>, Oct. 15, 2015, 5 pages.

"Automatic programming", retrieved from <<https://en.wikipedia.org/wiki/Automatic_programming>>, Sep. 30, 2015, 3 pages.

"Source code", retrieved from <<https://en.wikipedia.org/wiki/Source_code>>, Sep. 29, 2015, 5 pages.

"International Search Report and Written Opinion Issued in PCT Application No. PCT/US2016/056702", Mailed Date: Jan. 5, 2017, 16 Pages.

"Second Written Opinion Issued in PCT Application No. PCT/US2016/056702", Dated: Apr. 21, 2017, 12 Pages.

* cited by examiner

SOURCE-RELIANCE-FREE CONDITIONS 302

304: NO MAPPING 306 OF SOURCE CODE LINE NUMBERS 308 TO ASSEMBLY INSTRUCTIONS 222

310: NO SOURCE CODE 126

312: NO STATIC ANALYSIS 314 OF SOURCE CODE

Fig. 3

ARTIFACTS 124: CONSTANTS 402, VARIABLES 404, ARRAYS 406, FUNCTIONS 408, CLASS 410 MEMBERS 412, ...

Fig. 4

EXCEPTION 208 CAUSES 502: ACCESS VIA NULL POINTER 504, ACCESS OUTSIDE ADDRESS SPACE 506, DIVIDE BY ZERO 508, UNDEFINED OPERATION 510, ...

Fig. 5

EXCEPTION 208 SOURCES 602: COMPLEX EXPRESSION 604, 234, CHAINED METHOD CALLS 606, CHAINED DEREFERENCES 608, ...

Fig. 6

STORAGE LOCATIONS 230:
REGISTER 240, STACK 702, HEAP 704, SHARED MEMORY 706, ...

Fig. 7

```
cout << root.Left->Right->Left->Left->Value << endl;
01285E2A  mov         esi,esp
01285E2C  push        12810DCh
01285E31  mov         eax,dword ptr [root]
01285E34  mov         ecx,dword ptr [eax+4]
01285E37  mov         edx,dword ptr [ecx]
01285E39  mov         eax,dword ptr [edx]
01285E3B  mov         edi,esp
01285E3D  mov         ecx,dword ptr [eax+8]
01285E40  push        ecx
01285E41  mov         ecx,dword ptr ds:[12C5004h]
01285E47  call        dword ptr ds:[12C50C8h]
01285E4D  cmp         edi,esp
01285E4F  call        __RTC_CheckEsp (01281228h)
01285E54  mov         ecx,eax
01285E56  call        dword ptr ds:[12C50C4h]
01285E5C  cmp         esi,esp
01285E5E  call        __RTC_CheckEsp (01281228h)
```

Fig. 10

STORAGE ACCESS DEBUGGING WITH DISASSEMBLY AND SYMBOL ENTRIES

RELATED APPLICATION

The present application incorporates by reference the entirety of U.S. patent application No. 62/245,200 file Oct. 22, 2015. The present application also claims priority to U.S. patent application No. 62/245,200 file Oct. 22, 2015 to the full extent permitted by law.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Software submitted for execution on a given computing device may take the form of interpreted code, executable code, or a mixture of the two. Executable code is lower-level, in the sense that it includes processor architecture details such as register names and hard-coded register offsets. Executable code is typically generated from source code by a compiler. Source code resembles a natural language (e.g., English) but has strict syntactic and semantic limitations not present in natural languages. Even so, source code is often written in a programming language that is processor-architecture-agnostic, so it lacks many details found in executable code. Interpreted code can be written as source code, in a scripting language or other programming language. An interpreter may parse source code and perform the corresponding behavior directly, may translate source code into an intermediate representation which is then immediately executed, and/or may match the source code to pieces of precompiled code which are then executed.

Debugging executable code can be very challenging when the corresponding source code is not available, or when a source-level debugger that maps executable code to source code is either unavailable or ineffective. In addition to containing many processor-specific details not found in corresponding source code, in executable code symbolic names defined in source code have been translated into low-level storage identifiers such as registers and register-based memory accesses. Moreover, executable code is often tailored to a system architecture and/or optimized in ways that obscure the correspondence between source code and a given executable code instruction.

SUMMARY

Some embodiments are directed to the technical activity of debugging an executable code when the corresponding source code is not available, or when a source-level debugger that maps executable code to source code is either unavailable or ineffective. In particular, many examples herein are directed to debugging an exception by building and reporting a symbolic name for an apparent source of the exception without relying on source code. Other technical activities pertinent to teachings herein will also become apparent to those of skill in the art.

Some embodiments provide debugging support by obtaining a disassembly of a portion of the executable code. The disassembly includes a sequence of assembly instructions that are likely to be helpful, e.g., an assembly instruction Y at which an exception or other event of interest occurred and a dozen or two assembly instructions that precede Y. Next, an assembly instruction X is located which has two characteristics: (a) a mapping is known between a storage location accessed in instruction X and a symbolic name SYM_X for that storage location, and (b) data flow and/or control flow leads from instruction X to instruction Y, the instruction of interest. Then a symbolic name SYM_Y that pertains to instruction Y is built from SYM_X while interpreting the assembly instructions between X and Y. Finally, SYM_Y is reported to the user. Among other things, variations discussed include tools and techniques for locating the instruction X, and tools and techniques for determining a flow relationship between instruction X and instruction Y.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 3 is a block diagram illustrating some examples of source-reliance-free conditions;

FIG. 4 is a block diagram illustrating some examples of software artifacts that may have symbolic names;

FIG. 5 is a block diagram illustrating some examples of causes of exceptions during execution of executable code;

FIG. 6 is a block diagram illustrating some examples of exception sources which are built with symbolic names as components;

FIG. 7 is a block diagram illustrating some examples of storage locations which may be a target of access attempts during software execution;

FIG. 10 shows assembly instructions in a disassembly of an executable code.

DETAILED DESCRIPTION

Acronyms and Abbreviations

Figure 1:
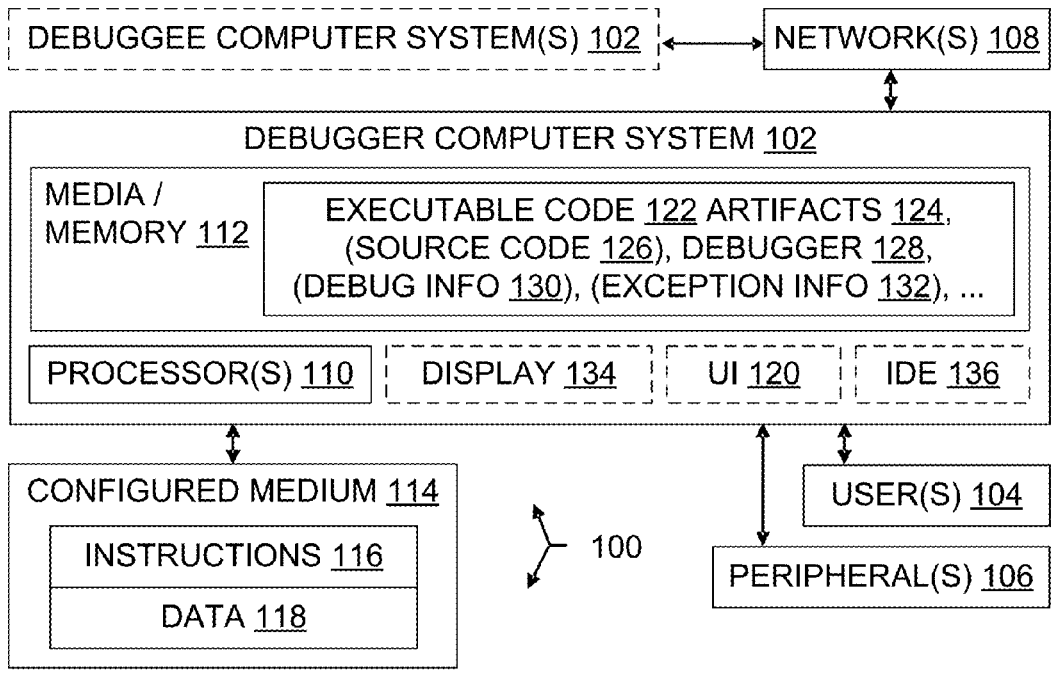
FIG. 1 is a block diagram illustrating a debugger computer system having at least one processor and at least one memory which interact with one another under the control of software for debugging executable code that ran on the debugger computer system and/or on another computer system, and also illustrating other items in an operating system, and also illustrating other items in an operating environment which may be present on multiple network nodes, and also illustrating configured storage medium (as opposed to a mere signal) embodiments.

Some acronyms and abbreviations are defined below, but others may be defined elsewhere herein or require no definition to be understood by one of skill.

ALU: arithmetic and logic unit
API: application program interface
CD: compact disc
CPU: central processing unit
DVD: digital versatile disk or digital video disc
FPGA: field-programmable gate array
FPU: floating point processing unit
GPU: graphical processing unit
GUI: graphical user interface
IDE: integrated development environment, sometimes also called "interactive development environment"
IL: intermediate language
LOC: location identifier
RAM: random access memory
ROM: read only memory
SYM: symbolic name Various assembly language instructions are also discussed herein, using well-established abbreviations such as "mov" for move, "cmp" for compare, "dword" for double word, "ptr" for pointer, "ds" for data segment", and lowercase "h" or "0x" to denote hexadecimal values, as well as register names eax, ecx, edi, esp, and so on.

Although examples herein favor x86 in the Intel syntax, one of skill will understand that the teachings herein also pertain in circumstances using x86 in AT&T syntax, circumstances using various assembly formats such as MASM or NASM formats, and assembly languages for other processor architectures, including but not limited to x64 and ARM processor architectures.

Overview

Even when source code and a source-code-capable debugger are available, if the source code contains complex expressions then the error messages given by the debugger may not identify precisely a problem source. For instance, a particular dereference or memory access attempt that caused an exception might not be identified in the debugger's user interface if the exception occurred within a complex expression that contains multiple dereferences or memory access attempts.

Consider a line of source code such as
double  mostExpensiveBuilding=m_Root→getChildById (REDMOND_EAST_CAMPUS)→getMostExpensive-Child( )→MaintenanceCost;

This source code contains a relatively complex expression, which includes three dereferences (indicated by arrows →) and two method calls (each indicated by a method name followed immediately by a left parenthesis).

In a given familiar debugger, an exception occurrence while executing the executable code generated from this line of source code may lead to an error message similar to this one:
Exception thrown at 0x01384F47 in TestCpp.exe: 0xC0000005: Access violation reading location 0x00000000.

The numbers in this error message do not provide sufficient help to most developers. In situations like this, where there are multiple dereferences in the source code line in which an access violation occurred, the information in this error message fails to specify which of the dereferences is responsible for the violation. Debugging may be especially difficult if the source code includes a macro which was expanded into different source code (not shown here) before executable code generation.

A developer may try to narrow the scope of possible problem sources by evaluating subexpressions. For instance, the developer may determine that m_Root appears to contain a valid value. But method calls and other subexpressions that evaluate to assignable values (so-called "r-values") rather than storage locations ("l-values") can hamper efforts to find out which variable, dereference, function call, or the like is the culprit.

In theory, a developer might examine the assembly code generated from the source code. But in practice, due to the complexities of code generation and processor architecture specifics, attempts to identify a culprit by examining assembly code are rarely even made. When made, they are usually quickly abandoned in favor of other approaches.

In particular, developers generally choose to break a syntactically complex but semantically coherent expression into smaller pieces. This is done merely to pin down the source of an exception or other problem, because it tends to make source code harder to understand, and may hamper code optimizations.

For instance, the line of source code in the example above might be rewritten as the following sequence of three statements:
rootChild  tmpChild=m_Root→getChildById(REDMOND_EAST_CAMPUS);
tmpChild=tmpChild→getMostExpensiveChild( );
double mostExpensiveBuilding=tmpChild→MaintenanceCost;
The three statement sequence is clumsier at expressing the intended meaning of the MaintenanceCost calculation, but is better suited to the particular debugger's limited ability to identify within a line of source code a particular source of the exception.

In short, it is hard for typical developers to deduce which variable or function call was the source of a problem when they face a line of source code containing a complex expression. Trying to evaluate some expressions to figure out what is null or otherwise invalid can be time consuming, and does not work with function calls. For most developers, looking at assembly instructions is not a desirable way of debugging access violations or other bugs, because of assembly code's complexity. It would be helpful to enhance debuggers to identify apparent problems within complex expressions, without requiring rewriting source code into smaller expressions spread over multiple lines merely to identify the culprit.

For instance, in the example above, an error message such as the following would be much more helpful:
Exception thrown: read access violation. Node::getMostExpensiveChild( . . . ) returned nullptr.

To provide enhanced debugging capabilities, some embodiments herein disassemble a function where a problem has occurred and perform a data flow analysis to deduce a symbolic name of the location at the heart of the problem. Some try to interpret a few instructions preceding the troublesome instruction, to go from a point where register content and meaning (in terms of symbolic names) are known, up to the point of interest. Some use symbol information to interpret dereferences and function calls. In some embodiments, going from a troublesome instruction backward is faster and more reliable than interpreting instructions from the beginning of the function, e.g., due to avoiding unnecessary control branches.

Some embodiments support exception reason analysis using disassembly and symbol information. Some perform disassembly analysis during debugging after an exception to provide a user with precise information about the reason for that unwanted situation. For instance, on an access violation some embodiments can describe to the user what variable or function call result was null or otherwise invalid.

Some embodiments described herein may be viewed in a broader context. For instance, concepts such as access, debugging, mapping, names, and validity, may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving access, debugging, mapping, names, and/or validity are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent in several ways to a wide range of attentive readers. First, some embodiments address technical activities such as software debugging, executable code disassembly, and assembly instruction interpretation. Second, some embodiments include technical components such as computing hardware which interacts with software in a manner beyond the typical interactions within a general purpose computer. For example, in addition to normal interaction such as memory allocation in general, memory reads and write in general, instruction execution in general, and some sort of I/O, some embodiments described herein analyze disassembled code using data flow and/or control flow analysis. Third, technical effects provided by some embodiments include avoidance of source code rewrites otherwise done merely to reduce the complexity of expression in a given line of source code, and identification of apparent problem sources without reliance on source code. Fourth, some embodiments include technical adaptations such as a custom interpreter that builds a symbolic name SYM_Y from a predecessor name SYM_X, a continuation expander, a register-to-symbol mapping, and/or a disassembly-based debugger which uses symbol table entries. Fifth, some embodiments modify technical functionality of a debugger by adding disassembly-based symbolic name building based on technical considerations such as data flow or control flow between a mapping-known instruction X and a problem-occurrence instruction Y. Sixth, technical advantages of some embodiments include improved accuracy of exception source identification, and increased debugging capabilities in the absence of source code. Other advantages will also be apparent to one of skill based on the description provided here.

Reference will now be made to exemplary embodiments such as those illustrated in the drawings, and specific language will be used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, smartwatches, smartbands, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "register" is a memory location within a processor and/or on the same chip as processor CPU/ALU circuitry. Accordingly, for present purposes on-board processor cache is a form of register.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

As used herein, "source code" means code written in a programming language at a level above processor-architecture-specific executable code or processor-architecture-specific assembly language code. Some examples of source code include code written in Ada, BASIC, C, C#, C++, COBOL, ECMAScript, FORTRAN, Java, LISP, MATLAB, Objective-C, Pascal, Perl, PHP, Prolog, Python, Ruby, T-SQL, Unix shell, and/or many other programming languages. Code written in x86 assembly, ARM assembly, or other assembly code that is tailored to a particular instruction set architecture, e.g., by use of register names and recognized instruction opcodes, is not considered source code herein. Likewise, executable code, also known as binary code, output by a compiler is not considered source code herein. Source code is often written manually by human developers, but may also be generated automatically by some programming tools.

"Optimize" means to improve, not necessarily to perfect. For example, it may be possible to make further improvements in a program which has been optimized.

"Program" is used broadly herein, to include applications, kernels, drivers, interrupt handlers, firmware, state machines, libraries, and other code written by programmers (who are also referred to as developers).

"Routine" means a function, a procedure, an exception handler, an interrupt handler, or another block of instructions which receives control via a jump and a context save. A context save pushes a return address on a stack or otherwise saves the return address, and may also save register contents to be restored upon return from the routine.

As used herein, a "storage access" is a read from a storage location (a register, a memory location, or other storage), a write to a storage location, or an attempt to read or write a storage location. A "storage location" is a location where a value can be stored. An "incorrect storage access" is a storage access which is incorrect because it causes an exception, brings execution to a halt, performs or attempts to perform an operation not recognized by a processor, and/or uses or attempts to use an incorrect value. For instance an attempt to dereference through a null pointer is an incorrect storage access in most if not all systems because null is not a valid address at which a value is stored. Likewise, an attempt to divide by zero and write the result to a register or other storage location is an incorrect storage access in most systems, even though a floating-point standard defines values representing infinity and not-a-number, because the attempt will prematurely halt execution of a program on those systems.

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. For example, certain familiar devices perform balance calculations to maintain their balance; some examples include mobile robots and SEGWAY® wheeled personal mobility devices (mark of Segway, Inc.). These devices illustrate the point that technical effects are provided by technical components, not by mere mental steps. Balance calculations simply cannot be performed rapidly enough by mental steps or by paper and pencil to provide the balance that is present in many mobile robots or wheeled personal mobility devices. The technical effect of having a dynamically balanced device is thus provided by technical components which include a processor and a memory interacting with balance control software. Similarly, operations such as disassembly, data flow analysis, control flow analysis, assembly language interpretation, symbol table or other symbol collection access, symbolic name building, and symbolic name reporting are understood herein as requiring and providing speed and accuracy that are not obtainable by human mental steps. This is understood by persons of skill in the art but others may sometimes need to be informed or reminded of that fact.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Linguistically" means by using a natural language or another form of communication which is often employed in face-to-face human-to-human communication. Communicating linguistically includes, for example, speaking, typing, or gesturing with one's fingers, hands, face, and/or body.

Throughout this document, use of the optional plural "(s)", "(es)", or "(ies)" means that one or more of the indicated feature is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as analyzing, attempting, building, creating, disassembling, executing, expanding, finding, forming, identifying, inferring, interpreting, locating, mapping, obtaining, regressing, reporting, satisfying, tracking, translating, using (or analyzes, analyzed, attempts, attempted, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave outside the scope of patentable subject matter under United States Patent and Trademark Office (USPTO) interpretation of the *In re Nuijten* case. Unless expressly stated otherwise in a claim granted outside the United States, a claim does not cover a signal per se.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se.

An "embodiment" herein is an example. The term "embodiment" is not interchangeable with "the invention". Embodiments may freely share or borrow aspects to create other embodiments (provided the result is operable), even if a resulting aspect combination is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other user interface (UI) presentations. A user interface 120 may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact in technological ways with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se.

The medium 114 is configured with binary instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, cell phone, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In the illustrated environments 100, one or more applications, utilities, interfaces, and/or other programs have executable code 122 which includes artifacts 124 such as constants, variables, classes, class instances (a.k.a. objects), routines, and the like. Corresponding source code 126 may also be present. Software development tools such as compilers, profilers (neither shown) and debuggers 128 assist with software development by producing and/or transforming code 122 126. Debug info 130 such as mappings between source code file name—line number pairs and positions in the executable code may be present. Debug info may also include a symbol table or other symbol collection generated during compilation. Debug info may also include state information about a crash or other execution stoppage of the executable software, e.g., an instruction pointer, current values of variables, and a stack call chain. When executable code crashed due to an exception, exception info 132 may be present, e.g., what kind of exception occurred and what value(s) caused the exception.

Debuggers and compilers themselves contain executable code. A kernel (not shown) is also typically present in the system 102, and kernels also contain executable code. However, unless indicated otherwise, the executable code 122 is understood to be part or all of the executable code of a debuggee, namely, executable code of software which is currently being debugged or software for which debugging is desired by the user 104.

The code 122, 126, debugger 128, and other items shown in the Figures and/or discussed in the text, may each reside partially or entirely within one or more hardware media 112, thereby configuring those media for technical effects which go beyond the "normal" (i.e., least common denominator) interactions inherent in all hardware—software cooperative operation.

In addition to processors 110 (CPUs, ALUs, FPUs, and/or GPUs), memory/storage media 112, display(s) 134, and battery(ies), an operating environment may also include other hardware, such as buses, power supplies, wired and wireless network interface cards, and accelerators, for instance, whose respective operations are described herein to the extent not already apparent to one of skill. The display 134 may include one or more touch screens, screens responsive to input from a pen or tablet, or screens which operate solely for output.

A given operating environment 100 may include an Integrated Development Environment (IDE) 136 which provides a developer with a set of coordinated software development tools such as compilers, source code editors, profilers, debuggers, and so on. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs.

One of skill will appreciate that the foregoing aspects and other aspects presented herein under "Operating Environments" may also form part of a given embodiment. This document's headings are not intended to provide a strict classification of features into embodiment and non-embodiment feature classes.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

Systems

Figure 2:
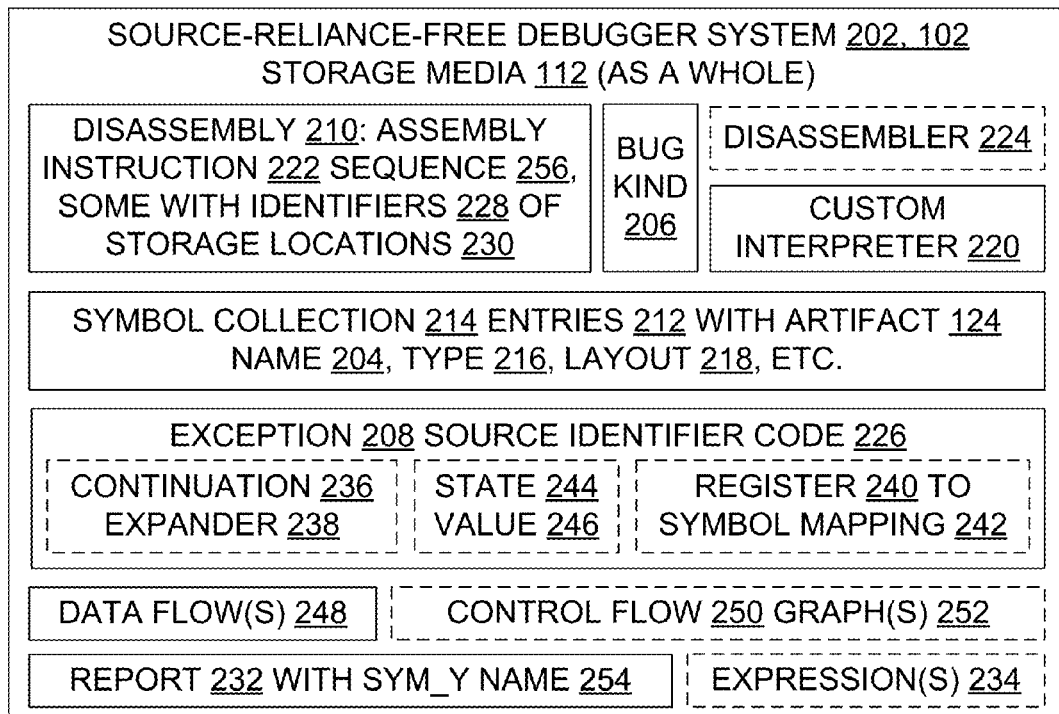
FIG. 2 is a block diagram illustrating aspects of debugging without relying on source code, in an example architecture.

FIG. 2 illustrates aspects of an architecture which is suitable for use with some embodiments. A source-reliance-free debugger system 202 is a particular kind of system 102 which is free of reliance on source code as to the identification of particular bug-related artifact names 204. This freedom does not necessarily mean that no source code 126 is present in the system, or that source code is not relied upon for other purposes during debugging. Absence of source code is one example of being source-reliance-free, but it is not the only example. Infringement of source-reliance-free claim limitations cannot be avoided merely by placing source code on a system 102 or by making spurious or unnecessary use of source code. Rather, "source-reliance-free" means that the bug-related artifact names for one or more particular category 206 of bugs can be identified by the system without using source code, e.g., even if all related uses of the source code were removed or commented out and hence shown to be spurious.

FIG. 3 illustrates some examples of source-reliance-free conditions 302 that may be satisfied by a given system 202. Under a no-mapping-to-source-lines condition 304, the system 202 contains no mapping 306 between source code line numbers 308 and assembly instructions 222 (or equivalently in this instance, between line numbers 308 and particular points in the executable code 122). A debugger may fail to identify the source code pertaining to an exception or other occurrence if a mapping 306 is not found by the debugger, even when source code itself is present. Failure to identify symbolic names pertaining to the occurrence often happens as a by-product of not identifying the source code line involved with the occurrence. Under a no-source condition 310, source code pertaining to an occurrence is not present on a system 202, or at least has not been found by the debugger 128. Under a no-static-analysis condition 312, either a static analysis 314 of source code pertaining to an occurrence has not been performed, or if performed the static analysis results have not been found by the debugger 128.

FIG. 4 illustrates some examples of artifacts 124 that may be involved in an incorrect storage access or other occurrence of interest. Those of skill recognize that executable code 122 may contain a large number of artifacts of many different kinds. Among the most frequent, however, are constants 402, variables generally 404, arrays 406 (typically having variables or constants as constituents), functions 408 ("function" is used interchangeably herein with "routine" and "method"), classes 410, and class members 412.

FIG. 5 illustrates some examples of causes 502 of exceptions 208. These include attempting to access memory through a null pointer 504, attempting to access memory outside a permitted address space 506, attempting to divide by zero 508, and attempting an operation 510 that is not defined for a given processor, e.g., an unrecognized opcode or a restricted opcode not properly authorized.

FIG. 6 illustrates some examples of different kinds of sources 602 that may be displayed as an apparent cause of an exception. These examples include complex expressions 604, chained method calls 606, and chained dereferences 608. Reference numeral 234 herein designates expressions generally, and 604 designates complex expressions. A "complex expression" herein is one involving at least two names 204.

FIG. 7 illustrates some examples of storage locations 230. These examples include processor registers 240, locations on a call stack 702, locations in heap memory 704, and locations in global shared memory 706. Those of skill recognize that memory 112 in particular and storage locations 230 generally may also belong to other categories.

Storage access exceptions 208 are used herein as an example bug category, but similar teachings could apply to other kinds 206 of bugs such as buffer overflows, virtual function dispatch errors, and other bugs involving an incorrect value written to a storage location that is known or can be determined. In the exception examples herein, a value is incorrect because it causes an exception 208. But values may also be incorrect in other ways, e.g., by reason of being written as part of a buffer overflow or being an incorrect destination address in a virtual function table.

Instead of using source code to identify a bug-related artifact name for a bug in the pertinent category 206, the system 202 is capable at least part of the time of identifying the artifact name using a disassembly 210 of the executable code 122 that is being debugged, in combination with one or more entries 212 of a symbol table or other symbol collection 214. The symbol collection 214 is typically generated by a compiler during compilation, and contains information such as artifact names, data types 216, and storage layouts 218, e.g., member or field offsets from a base address. Depending on the compiler, a symbol collection 214 may reside in the same file as the executable code 122 and/or in one or more separate files of debug info 130.

Recall the example line of source code given earlier, which is repeated here:
double mostExpensiveBuilding=m_Root→getChildById (REDMOND_EAST_CAMPUS)→getMostExpensive-Child( )→MaintenanceCost;

Symbol collection entries 212 generated in connection with the content of this source code would include at least names 204 for the variables mostExpensiveBuilding and m_Root, and names for the class member methods getChildById and getMostExpensiveChild and the class member variable MaintenanceCost.

Whether REDMOND_EAST_CAMPUS would have an entry 212 would depend on how it is implemented. If it is a variable name, then it would have an entry in the symbol collection. But it would not have an entry if it were implemented by a preprocessor directive such as:
define REDMOND_EAST_CAMPUS 7

Regardless, the relationships between the symbol names, i.e., the arrangement of dereferences and method calls in the source code, is not part of the symbol collection 214. Thus, the symbol collection 214 contains substantially less information than the source code 126. Informally, the symbol collection 214 lists the artifacts 124 used in the source code but does not indicate how they are used.

In some embodiments, the system 202 includes a processor 110 and a memory 112 in operable communication with the processor. For convenience, the processor is referred to as the debugging processor, because it is not necessarily the same physical processor that was used to execute the executable code 122 that is being debugged. It may be the same physical processor. Or the debugging processor may be a different physical processor, e.g., be part of a different machine than the machine that ran the executable, but still have the same architecture as that debuggee processor, e.g., both could be x86 processors, or both could be ARM processors. The debugging processor could even be a different physical processor with a different architecture than the debuggee processor, since a custom interpreter 220 is used to interpret the disassembly 210 of the executable code. The interpreter 220 may run on one processor of a first architecture while interpreting a disassembly of executable code that targets another processor of a second architecture.

The memory 112 of the system 202 is similarly referred to for convenience as a debugging memory. The debugging memory contains the disassembly of at least a portion of the executable code. The disassembly 210 includes a sequence 256 of assembly instructions 222 which includes at least an instruction Y at which an exception or other incorrect storage access occurred during execution of the executable code by the debuggee processor. As noted, the debugger processor in a given particular system 202 and the debuggee processor (which is not necessarily part of the system 202) may be the same processor or be different processors. The disassembly may be provided by a disassembler 224, which (other than its use as taught herein) may be a familiar disassembler that uses familiar techniques to create the disassembly from part of the executable code.

In this example, the debugging memory also contains an exception source identifier code 226 which upon execution by the debugging processor locates within the assembly instructions 222 at least one candidate for an instruction X. The instruction X includes a storage location identifier 228 denoted here as LOC_X, which identifies a storage location 230. That storage location has a symbolic name, denoted here as SYM_X, that is defined in terms of at least one entry 212 of the compiler-generated symbol collection 214.

For example, in the following short example sequence of two assembly instructions 222, the storage location identifiers 228 include "eax", "dword ptr [root]", "ecx", and "dword ptr [eax+4]":
mov eax, dword ptr [root]
mov ecx, dword ptr [eax+4]

Upon execution, this exception source identifier code 226 also attempts to track data flow from the candidate for the instruction X through to the instruction Y at which the exception or other incorrect storage access occurred. The instruction Y includes a storage location identifier LOC_Y which has a symbolic name SYM_Y that is defined in terms of at least one entry of the compiler-generated symbol collection and is built up from SYM_X during successful data flow tracking to instruction Y from one of the candidate(s) for instruction X, thereby confirming that candidate as the instruction X, and (c) reports SYM_Y as an apparent source of the exception. For example, if instruction X is at a point where the storage location identified at that point by "eax" corresponds to SYM_X "m_root", then data flow could track from eax to yield a SYM_Y that includes "m_root", e.g., "m_Root→getChildById( . . . )". The built-up name 254 denoted here by SYM_Y itself does not typically appear as a name 204 within the symbol table but is rather composed of such names 204. As to tracking 834, data flows 248 and control flow 250 graphs 252 are discussed elsewhere herein, but one of skill will understand that data flow pertains to the flow of data during execution of software, and control flow pertains to the flow of control during execution in view of statement sequences, conditional statements, function calls, exception handling, and the like.

In some embodiments, the debugging memory contains data 118, 214 accessible to the exception source identifier code 226 which identifies (a) names 204, types 216, and storage locations 218 of variables used in the executable code, (b) names 204 and return types 216 of functions used in the executable code, and (c) names 204 and storage layouts 218 of classes used in the executable code.

In some embodiments, the system includes a report 232 from the exception source identifier code reporting at least one of the following as human-readable code including a name 254 (denoted here by SYM_Y) as an apparent source of the exception: a complex expression 604, chained method calls, or chained dereferences. For example, the following SYM_Y name 254 is a "complex expression" because it includes names 204 from at least two symbol collection entries 212, and it also illustrates chained method calls and chained dereferences:
m_Root→getChildById( . . . )→getMostExpensiveChild( . . . )→MaintenanceCost The report 232 may be on a volatile or non-volatile medium, written to a file or printed to paper or transmitted by email or text message, displayed on a screen or spoken as generated speech, or take any other form which is capable of transmitting the SYM_Y name as content to a user 104. Detailed reports 232 may help developers avoid 850 rewriting 852 the example line of source code as multiple statements which are clumsier at expressing the intended meaning of the MaintenanceCost calculation, but better suited to a conventional debugger's limited ability to identify within a line of source a particular cause of the exception.

As another example of rewriting 852 to get rid of chained calls, consider this line of source code: "Color optimalRoomColor=GetGlobalCache(     )→UsersPreferences(         )→Housing(VINTAGE)→Room(LIVING_ROOM)→Color;".
One rewritten version looks like this:
GlobalCache*globalCache=GetGlobalCache( );
Preferences*usersPreferences=globalCache→UsersPreferences( );
Preferences*housingPreferences=usersPreferences→Housing(VINTAGE);
Preferences* livingRoomPreferences=housingPreference→Room(LIVING_ROOM);
Color optimalRoomColor=livingRoomPreferences→Color;
In the rewritten version, temporary values are easily investigable because they are stored in local variables, which can be inspected by an expression evaluator. Also, knowing which line caused an exception is now enough to figure out what was null, because the rewrite has only one dereference per line. However, it may take a long time to recompile the project after the rewrite (e.g., several hours) and the bug may be not easily reproducible. In addition, under rewriting 852 the code gets less readable and longer.

In some embodiments, the system includes a report 232 from the exception source identifier code reporting SYM_Y as an apparent source of the exception, and SYM_Y includes at least one of the following at the exception or other occurrence of an incorrect storage access: a name 204 of a variable that contained an invalid address, an expression 234 that was evaluated to an invalid address, a name 204 of a function that returned an unexpected null pointer, a name 204 of a local variable which contained an invalid pointer value, an expression 234 representing a series of consecutive class member dereferences which led to an invalid pointer value, a name 204 of a variable that contained zero or an expression that was evaluated to zero, a name 204 of the method that attempted to allocate memory, or a name 204 of a parameter that contained an invalid input value.

In some embodiments, the exception source identifier code 226 includes a continuation expander 238 and a register-to-symbol mapping 242. Continuations 236 and a technique for expanding them, in conjunction with state 244 and value 246 structures, are discussed later in this document. At this point is it sufficient to give an example. Assume one has four instructions for an embodiment to interpret. Instruction number one should be executed first and so on. Assume the embodiment already has a continuation alpha that represents instructions three through four. Thus, alpha saves all information needed to interpret instructions three and four. This continuation can execute those instructions given an input state in an abstract machine. Suppose instruction three reads a number from register eax and instruction four prints this number to the output. Then if continuation alpha is given a state where there is a number 777 in eax, continuation alpha will print this number 777 to the output. One can reuse this continuation, giving it another input state. Continuations have the property that they can be expanded backwards, that is one can construct continuation beta representing instructions two through four using continuation alpha plus knowledge about instruction two.

Registers 240 are on-board memory in processors 110, e.g., in the x86 processor architecture, some of the registers 240 include storage locations 230 typically identified as eax, ecx, edx, edi, esp, and esi, among others. A register-to-symbol mapping 242 maps a register at a given point in the executable code (and thus in the disassembly) to the symbolic name assigned by the developer (or in some cases, by a compiler or other code generator) to represent the value stored at that point in the register. During compilation, operations such as register assignment and/or register allocation map variables to registers. The register-to-symbol mapping 242 may be viewed as an inverse of these operations.

Although code 226 is referred to as "exception source identifier code" it may also be understood as "incorrect storage access source identifier code" because, as explained elsewhere herein, exceptions are not the only occurrences associated with incorrect storage accesses. Buffer overflows and incorrect addresses in interrupt handler, virtual function, or other dispatch tables are some other examples of incorrect storage accesses.

In some embodiments, the system includes a symbolic computation interpreter 220 in operable communication with a disassembler 224 and a debugger 128. For example, the debugger may invoke the disassembler to create the disassembly 210 and then pass control to the symbolic computation interpreter 220 to build a SYM_Y symbolic name 254 for an instruction Y in the disassembly. In some embodiments, the interpreter 220 operates with abstract storage locations because while the debugger 128 may have all pertinent knowledge about program and machine state when the program is stopped at crashing instruction Y, it does not have access to this information at point X where an innovative analysis is beginning the interpretation as taught herein. Thus the interpreter 220 performs this interpretation 832 symbolically using these abstract storage locations (that is, identifiers 228 and/or names 204) rather than performing a literal instruction interpretation.

In some embodiments, the assembly instructions 222 are in human-readable form. Disassemblers 224 typically produce human-readable instructions, e.g., like those illustrated in FIG. 10, so those may as well be used when they are available. However, one of skill will recognize that the teachings herein for building a SYM_Y name 254, for instance, do not require human-readable assembly instructions 222, since the pertinent operations are performed by a computing system 202, not by a human. For example, one embodiment implementation does not use or contain software that translates machine code 122 into a textual representation of that machine code as a disassembly 210. However, embodiments do contain or use software that has embedded within it by reason of its behavior some understanding of machine instructions 116. This may be implemented as part of an exception analysis algorithm module directly, or as a separate layer which is invoked by an exception analysis algorithm module. It may be described to as a "disassembler" 224, or as an "instruction decoder" (which is also referenced here by numeral 224, since a different name, not different functionality, is what is being discussed). Regardless of the name used, component 224 provides a description of what the instruction does when executed, e.g., it is a move instruction, an add instruction, etc. Component 224 also provides information for following control flow, e.g., an indication when the next instruction to receive control will start execution and an indication whether the current instruction is a jump, a call, a conditional jump, or an instruction from which control flows to the next instruction in the sequence, e.g., as it does with an add instruction, an xor instruction, and similar instructions.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such as a portion of the Internet of Things, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, the debuggee processor(s) may be on one or more devices/systems 102 in a networked cloud, the incorrect storage access source identifier code 226 may run on a debugging processor on another device within the cloud, and the resulting report 232 may be transmitted to configure the display(s) on yet other cloud device(s)/system(s) 102.

Processes

Figure 8:
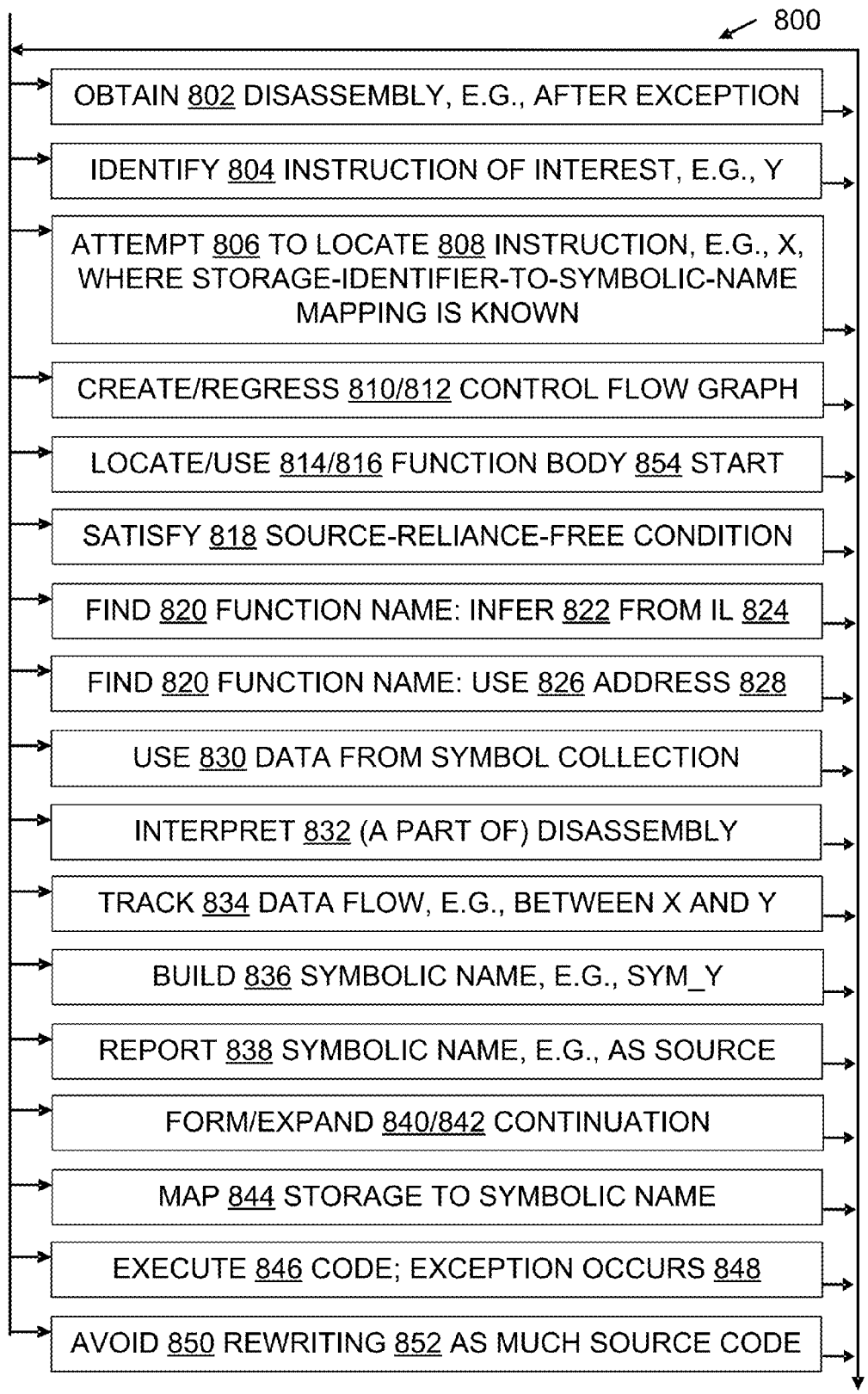
FIG. 8 is a flow chart illustrating aspects of some process and configured storage medium embodiments.

FIG. 8 illustrates some process embodiments in a flowchart 800. Technical processes shown in the Figures or otherwise disclosed may be performed in some embodiments automatically, e.g., by a debugger module launched automatically when exception info 132 indicates an exception occurred in the debuggee. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 8. Steps may be performed serially, in a partially overlapping manner, or fully in parallel. The order in which flowchart 800 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

One method embodiment includes obtaining 802 in a digital memory 112 a disassembly 210 of at least a portion of an executable code 122 after an incorrect storage access occurred during execution of the executable code. The disassembly 210 includes a sequence 256 of assembly instructions 222 which target a processor 110.

This method also includes locating 808 within the assembly instructions an instruction X which is characterized as follows. First, the instruction X includes a storage location identifier LOC_X. Those of skill recognize that some assembly instructions 222 do not include a storage location identifier 228, e.g., in the x86 architecture HLT and NOP do not include a storage location identifier. Second, the storage location identifier LOC_X identifies a storage location which has a symbolic name SYM_X that is defined in terms of at least one entry 212 of a compiler-generated symbol collection 214. Those of skill recognize that sometimes an assembly instruction 222 storage location identifier 228 does not map cleanly to a symbol entry name 204. For example, an instruction "xor eax,eax" which identifies a storage location (register eax) may be executed simply to zero out eax for subsequent use, without using eax to hold the value of a variable that has a name 204.

This method also includes interpreting 832 one or more instructions 222 within the disassembly forward from the instruction X through an instruction Y. Y may be identified 804 as the instruction at which the incorrect storage access or other event of interest occurred, e.g., by an instruction pointer value in exception info 132, or by user input through a debugger interface 120. The instruction Y includes a storage location identifier LOC_Y which has a symbolic name SYM_Y, and SYM_Y is defined in terms of at least one entry 212 of the compiler-generated symbol collection. Moreover, the instruction Y is in a data flow 248 from instruction X. Hence, SYM_X is propagated forward during the interpretation 832 to become part of SYM_Y. SYM_Y is built 836 using 830 SYM_X and other data from the symbol collection, based on the instructions 2222 between X and Y. For instance, if the instructions start by initializing a register to the value of m_root, and then dereference a method of m_root at the offset assigned to getChildById( ) then SYM_X is "m_root" and SYM_Y, at least so far, is "m_root→getChildById( . . . )" or something similar, since parameters may be indicated or omitted, depending on the implementation.

Finally, this method reports 838 a SYM_Y name 254 in a debugging environment 100 as an apparent source 602 of the incorrect storage access or other event.

There are various ways to attempt 806 to locate 808 a suitable instruction X. In some cases, locating 808 the instruction X includes locating 814 a first instruction of a function 408 body 854. The function body 854 includes instruction Y. Then the method uses 816 the first instruction of the function body as the instruction X. In some cases, locating 808 the instruction X includes creating 810 a control flow graph 252 having nodes which correspond to instructions in the sequence of assembly instructions, and then regressing 812 from instruction Y backward through the control flow graph to the instruction X. Regressing from Y instead of moving forward from X helps avoid control flow branches that do not connect X and Y.

In some cases, the reported name 254 SYM_Y includes at least one of the following: a developer-defined function 408 name 204, a developer-defined variable 404 name 204, a developer-defined class 410 member 412 name 204, or a developer-defined array 406 member access.

In some embodiments, at least one of the following source-reliance-free conditions 302 is satisfied 818:

Condition 304: the locating 808 and interpreting 832 are performed without using any mapping 306 between source code line numbers 308 and particular assembly instructions 222 of the sequence, Condition 310: the locating 808 and interpreting 832 are performed in the absence of, and without use of, a source code 126 from which the executable code 122 was generated, or Condition 312: the apparent source 602 of the incorrect storage access is identified (e.g., built 836) and reported 838 by using the method instead of and without identifying the source of the incorrect storage access by performing a static analysis 314 of source code from which the executable code was generated.

In some embodiments, the incorrect storage access resulted 848 in an exception 208, and the instruction Y caused a processor to attempt at least one of the following during execution of the executable code 122: attempt 504 a memory access through a null pointer, attempt 506 a memory access outside an assigned address space, attempt 508 a division by zero, attempt 510 an operation which is undefined for the processor 110 that is targeted by the assembly instructions.

In some embodiments, the name 254 SYM_Y includes a name 204 of a function 408 and the method includes finding 820 the name of the function by inferring 822 the name of the function from intermediate language code 824 corresponding to the executable code. For instance, Common Intermediate Language (CIL) code often contains instruction statements such as call int32 Foo::Add(int32, int32) From this statement, the function name "Foo" can be inferred, from its position after "call" earlier on the same line and its position between the double colon and the left parenthesis.

In some embodiments, the name 254 SYM_Y includes a name 204 of a function 408 and the method includes finding 820 the name of the function by using 826 an address 828 of a body of the function as an index to find the name of the function in the symbol collection 214.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured into an embodiment using items such as incorrect storage access source identifier code 226, storage location 230 to symbolic name mappings 844, and reports 232, in the form of data 118 and instructions 116, read from a removable medium 114 and/or another source such as a network connection, to form a configured medium. The configured medium 112 is capable of causing a computer system to perform technical process steps for building symbolic names 254 using symbol entries 212 and a disassembly 210 as disclosed herein. The Figures thus help illustrate configured storage media embodiments and process embodiments, as well as system and process embodiments. In particular, any of the process steps illustrated in FIG. 8, or otherwise taught herein, may be used to help configure a storage medium to form a configured medium embodiment.

Some embodiments use or provide a digital storage medium 112 containing and configured by software which upon execution by at least one processor performs a method that includes obtaining 802, interpreting 832, and reporting 838 steps. The obtaining step 802 obtains a disassembly of at least a portion of an executable code after an exception occurred 848 during execution 846 of the executable code. The disassembly includes a sequence of assembly instructions. The interpreting step 832 interprets one or more instructions 222 within the disassembly through an instruction Y at which the exception occurred. The instruction Y is an instruction to access a storage location which has a symbolic name 254 SYM_Y that is defined in terms of at least two entries 212 of a compiler-generated symbol collection 214. The instruction Y is connected by a data flow to an instruction X. X is an instruction to access a storage location that has a symbolic name 204 or 254 SYM_X which is a component of SYM_Y. The reporting step 838 reports SYM_Y in a debugging environment as an apparent source of the exception.

In some embodiments, the method includes forming 840 a continuation 236 by translating assembly instructions into the continuation, and also includes expanding 842 the continuation until the instruction X is located 808. One implementation architecture for doing this is discussed below and in connection with FIG. 9.

In some embodiments, the method includes mapping 844 from processor registers and local storage slots to symbolic names 204. This may be done by finding a point at which the mapping is known, and then adding to the mapping as subsequent instructions are interpreted 832. For instance, the mapping can be known at an assembly instruction which loads a register with a function address or with a base address for an object or an array. The mapping may also be based at least in part on reversal of the register allocation performed at compilation, since that maps variables to registers.

In some embodiments, the method performs symbolic data flow analysis to build 836 SYM_Y, as opposed to operating solely on primitive data types such as int or pointer. An interpreter 220 may be more than just a data flow analyzer in the sense that data flow analyzers usually operate only on primitive types and are not coded to perform operations on symbols. For example "leftSon→GetParent( )" in one interpreter 220 is treated as a first-class citizen while in most data flow analyzers the return value would be assigned to a temporary variable and analyzer would later operate on that temporary variable instead of treating it as a "leftSon→GetParent( )". Custom interpreter 220 in this example tries to keep an original (source code) form of an expression instead of trying to simplify the expression by introducing temporary variables. Thus, methods may perform some symbolic computations while interpreting a disassembly, instead of trying to evaluate the actual value of an expression as would be done in an expression evaluator. Tools and techniques of symbolic computation, such as expression rewriting rules, may accordingly be adapted for use according to the teachings herein. Unknowns are symbols and an answer is an expression using those symbols.

In some embodiments, the interpreting 832 (and hence the interpreter 220) is optimized to support only frequently used assembly instructions 222. For instance, an interpreter for x86 might only recognize mov, push, pop, cmp, and add instructions. Depending on the executable code, other assembly instructions such as test, nop, jmp, and jnz may correspond to five percent or less per capita of the executable code, and be among instructions not recognized by the interpreter 220.

In some embodiments, SYM_X identifies a developer-defined variable or constant which is being read, and type information 216 for a value of the variable or constant that is being read is indicated in the disassembly 210 and/or in the compiler-generated symbol collection 214. Type information may assist proper placement of dereference indicators (e.g., "→") and method call indicators (e.g., parentheses) as SYM_Y is built 836.

Some embodiments provide a method which includes obtaining 802 a disassembly 210 of at least a portion of an executable code 122 after an exception occurred 848 during execution of the executable code, and reporting a name of a software artifact which is an apparent source of the exception. The method includes tracking 834 at least one data flow within the disassembly and also includes correlating at least one of the assembly-level instructions with the name of the software artifact. The software artifact belongs to a group that comprises functions, variables, and class members. Identification of the artifact is accomplished without relying on any source code that corresponds to the sequence of assembly-level instructions.

Additional Examples

Additional details and design considerations are provided below. As with the other examples herein, the features described may be used individually and/or in combination, or not at all, in a given embodiment.

By way of context, in some familiar software development environments, when a developer encounters an access violation exception while running an application under a debugger, only a file name and a line number where the problem occurred are given to aid identification of the specific cause of the exception. This information is not always sufficient to quickly figure out where invalid memory address, for instance, came from. Insufficiency is especially likely if the line contains a complex expression, chained method calls, or chained dereferences.

The following is an example of a complex expression: if (((*pLeft==TERMINAL_NODE) && (*pLeft==*pRight))|| (pLeft→Value==pParent→Value)) for example "pRight was nullptr". In this expression, pLeft, pRight or pParent could be bad and thus cause an exception.

The following is an example of chained method calls: Color optimalRoomColor=GetGlobalCache( )→UsersPreferences( )→Housing(VINTAGE)→Room(LIVING_ROOM)→Color. In this example a report may state "GetGlobalCache( )→UsersPreferences( ) returned nullptr", for instance.

The following is an example of chained dereferences: Color optimalRoomColor=GlobalCache→UsersPreferences→Housing→Room→Color for example "GlobalCache→UserPreferences→Housing was nullptr". Without the teachings herein, it is difficult to figure out which arrow operation (that is, which dereference) failed.

The present document describes solutions which, e.g., show in the debugger analysis results the name of a variable that contained an invalid address or an expression that was evaluated to give an invalid address. Although some examples focus on access violation exceptions in native code or NullReferenceException in managed code, teachings herein also apply to handle some other types of exceptions.

As examples of exceptions a given embodiment may help debug and the information it provides, the following are submitted for consideration.

Memory address exception. An embodiment shows the name of a variable that contained invalid address, an expression that was evaluated to invalid address, a name of a function that returned an unexpected nullptr, a name of a local variable or other variable which contained invalid pointer value, or an expression representing a series of a few consecutive class member dereferences which led to invalid pointer value. A variable may be a function argument or a static class field. Cases of read/write and null/invalid access violations can be investigated per teachings herein.

Divide by zero exception. An embodiment shows the name of a variable that contained zero or an expression that was evaluated to zero.

Out of memory exception. There are at least two scenarios where an exception can be raised: low-level and high-level. Low level scenarios involve trying to do something not allowed by a processor, e.g., trying to divide by zero or trying to access an address not in the memory space. In this case a processor won't execute an invalid assembly instruction, e.g., "add [valid_location], [null_location]" and the debugger will be notified. This kind of exception is language agnostic. An embodiment may show, e.g., the name of the method that attempted to allocate memory. Some embodiments do not analyze out of memory exceptions.

High-level scenarios involve trying to perform some operation that fails, but a lower level layer (e.g., operating system) can handle this failure and notify users about a failure. For example if code is trying to allocate memory in C++ using the "new" function, "new" can ask the operating system for some memory and if the operating system refuses to complete the request the "new" function can throw an exception, executing an interrupt assembly instruction after getting an undesired response from the operating system. This kind of exception is language specific. Some embodiments do not analyze exceptions handled by lower level code, e.g., by an operating system.

Some embodiments inspect a topmost stack frame to find the source of the problem. (A stack frame can treated as an instance of a function call. If a function calls a function it creates new frame for that function, pushes it onto the stack and transfers control to called function. Upon competition of a call the frame is removed from the stack and the control is transferred back to the caller). In the high-level scenario a developer may investigate a stack frame representing the "new" function call, which wouldn't give much information because this function is generic. Detecting the source of the problem would probably involve walking the stack.

Invalid input exception. An embodiment shows the name of the parameter that contains the invalid input value.

Source code static analysis 314 can detect some simple mistakes like never assigning to local variable something else than null pointer. However, static analysis fails to analyze cross-function data flow or dereferencing an object's member. Hence, it falls short of the results described herein.

Without the benefit of the teachings herein, a developer who encounters an access violation related exception may look at the place where the exception was raised and try to evaluate some expressions related to that place in the source code. This approach may be very time consuming if there are many possible expressions to evaluate, and it is often not feasible to evaluate some r-values. For example, the value returned from "GetGlobalCache( )→UsersPreferences( )" is not stored in any developer-named variable, so a conventional expression evaluator does not reliably to inspect this value; calling a function again can have side effects and give a different result each time.

If a user has chained method calls and one of those methods returned null, the user can either look at a disassembly which is hard for many developers, or rewrite 852 that line to get rid of chained calls and make it debuggable with familiar tools. In addition, if the code 126 was compiled with optimizations, a source code to native code mapping can be very inaccurate or missing. For example, a compiler can perform optimizations which reorder instructions. Consider this code:
int lhs=pLeft→Value;
int rhs=pRight→Value;
The compiler may optimize by generating machine code which first computes both expressions at the right sides of the assignments and then performs both assignments. In that case the mapping is unclear because one source code statement doesn't translate to a continuous range of assembly instructions. However, helpful information may still be gained using teachings presented herein. On the other hand, optimizations may replace some variables with constants, and symbol collection 214 information may be lost. Symbol collection 214 information may have also been intentionally obfuscated and/or stripped from executable code, and therefore not be available for use as taught herein.

Current debug files also lack adequate information 130 to pinpoint an exception source within a complex expression. Substantially more info would be needed in debug files, e.g., an Abstract Syntax Tree-to-individual-assembly-instruction mapping to show where each instruction 222 came from, and a map of symbolic names (function, variable, class member names 204) to processor registers 240 and other memory storage locations 230. Currently used debug file formats such as PDB format do not provide this level of detail.

Some solutions herein support C and/or C++ development. Access violation exceptions in native C and/or C++ development are not unusual, so the diagnostic tools and other improvements described herein may ease the pain of fixing access violation related bugs. Some solutions taught herein use a technique of data flow analysis on a disassembly combined with symbol information to perform analysis independent of a source code to machine code mapping. This allows useful analysis even in many optimized code cases. Innovative techniques help developers find a source of a problem even if a null/invalid pointer was an r-value and had no storage location represented by a symbol.

Disassembly 210 may or may not be displayed in a given implementation. Operation according to the teachings herein may or may not be discussed in a given vendor's documentation. If complex symbolic names of exception sources are given to developers even in the absence of source code, and only current limited-info symbol file formats (e.g., PDB) are present, then teachings herein may be in use even if the documentation is silent on how that is accomplished. The source identifier code 226 or another implementation of the present teachings may be part of a debugger, or be a debugger add-on, or be provided as a separate development tool. It may also be integrated in an IDE 136.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion is derived from internal Visual Studio® solution documentation (mark of Microsoft Corporation). Visual Studio® includes software implemented by Microsoft Corporation. Aspects of the Visual Studio® software and/or documentation are consistent with or otherwise illustrate aspects of the embodiments described herein. However, it will be understood that Visual Studio® documentation and/or implementation choices do not necessarily constrain the scope of such embodiments, and likewise that Visual Studio® software and/or its documentation may well contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure. Likewise, identifiers and some terminology used in discussing details are implementation-specific and thus need not pertain to every embodiment, although they may help particular readers understand aspects of some embodiments.

Memory Violation Hints in the Debugger
Overview

One of the main goals of a debugger may be to help a user find and fix bugs as fast as possible. A goal of this project is to provide the user verbose information about the source of a problem when an access violation exception occurs. Showing the user what variable/function call was the cause of raising an access violation can greatly reduce debugging time when the access violation occurred in code whose source code line includes a complex expression.

Functionality

A user who is debugging an application can benefit from information about the source of an invalid address when an access violation exception occurs. Such information may be a name of a function that returned an unexpected nullptr, a name of a local variable which contained an invalid pointer value, or an expression representing a consecutive class member dereferences which led to an invalid pointer value, for example. The environment may support C++ and .Net Native debugging, for example. Support may be provided for x86 and amd64 architectures, for example.

The teachings can also be applied to other executable formats, e.g., JIT (Just In Time) compiled code, which is used in connection with C# or Java® code, for example. Java® is a mark of Oracle America, Inc.

The executable code being debugged may be a debug version (a.k.a. "debug bits"), or a release version (a.k.a. "release bits").

An Example Architecture and Implementation

To get a name of a symbol that "contained" invalid address this example performs a disassembly analysis.

First the enhanced debugger code disassembles the function whose execution caused an access violation. Then it constructs a control flow graph 252, where instructions are nodes. Next it reverses this graph to interpret assembly instructions using a continuation approach. Reversing a graph is done by reversing the direction of edges, that is, by replacing an edge from A to B with an edge from B to A.

The enhanced debugger code interprets assembly instructions, as a heuristic, because the knowledge of the symbols valid at the starting point may be sufficient to deduce what was the source of a problem. Because of a limited instruction subset supported by the interpreter, the code performs a linear search on the number of instructions needed to interpret to get a result starting from an instruction whose execution caused an access violation. Testing indicates that it is often sufficient to interpret less than 20 instructions to get a result, when it is possible to get one at all.

As an example, consider FIG. 10. A line of source code appears at the top of the Figure, namely, "cout<<root.Left→Right→Left→Left→Value<<endl;". Below the source code are some corresponding assembly instructions, one per hexadecimal-numbered line. The topmost (first) assembly instruction, for example, is "mov esi,esp" which is an instruction to move the content of the esp register into the esi register. For reference in this discussion, a superimposed arrow points at the assembly instruction on line 012B5E39, "mov eax,dword ptr [edx]". Assume an error message like the following has been given: "Exception thrown: read access violation. root.Left→Right→Left was 0xCCCCCCCC." This is a helpful message, because it identifies the source of the exception using names 204 that are meaningful to a developer 104.

To arrive at this error message 254, an embodiment may have first interpreted only the instruction annotated by the superimposed arrow, which is where an access violation reportedly occurred 848. However, the effort to build the string 254 would fail when the embodiment is unable to determine (in terms of symbolic names) what edx stores at this instruction address. This instruction is treated as a continuation and expanded to include the preceding instruction, "mov edx,dword ptr [ecx]". However, this also fails to yield adequate symbolic name information. A third instruction is added to the continuation, "mov ecx,dword ptr [eax+4]". This also fails to yield adequate symbolic name information. Expansion 842 to four instructions 222 leads to success. Because of information about root at 012B5E31 and in a symbol collection 214 entry 212 for root, the embodiment is able to analyze data flow and deduce what is in edx at 012B5E39. Then, the helpful error message above can be built by symbolic computation forward from 012B5E31 (address of an example of instruction X) to 012B5E39 (the address of an instruction Y in this example).

Some additional observations may be helpful.

As to information about root at 012B5E31 "mov eax, dword ptr [root]" might come in a given circumstance from an original assembly instruction such as "mov eax, [ebp-40]", when the debugger knows from the symbol provider that there is a variable named "root" under the "ebp-40" location. The debugger may even show this name in a disassembly window. The same symbol provider may be used in an embodiment implementation, but significantly more symbol information is used than in the disassembly window.

This continuation-expanding approach is O(n$^2$), but that does not make it prohibitively expensive because n is small and can be capped, e.g., at 5 or 10 or 20 instructions. In an assembly, an attempt to access some memory location very rarely takes more than 5 to 10 instructions.

Multiple paths may be traversed if control branch instructions are encountered. The interpreter can be relatively simple once the teachings herein are understood, in the sense that it can be implemented to support only a limited number of instructions rather than supporting the full instruction set recognized by the debuggee processor. Only a small subset of a given processor's full instruction set is typically used in a given executable, and the pertinent subset is even smaller if one focuses on code that is responsible for dereferencing something. It is acceptable for an embodiment to sometimes fail to produce a helpful error message; the teachings are heuristics not guarantees. Support for a limited set of instructions provides additional reason to interpret backwards in the manner just discussed in connection with FIG. 10.

An embodiment may assume that a return value from a function is always in the eax register on an x86 processor. This is true in almost all cases, but not always. It may also assume that a function destroys content of a few registers when called, which may be an overestimation sometimes.

Valid mapping of symbol names to storage locations at a given point in this process are provided by a symbol provider, e.g., a symbol database 214 provided by a compiler. Some symbol name mappings are valid only in a range of a few assembly instructions instead of an entire function body, because there is a limited set of processor registers. They are reused, storing more than one variable throughout the execution of a function body. An embodiment may obtain that information from the symbol provider as well.

Figure 9:
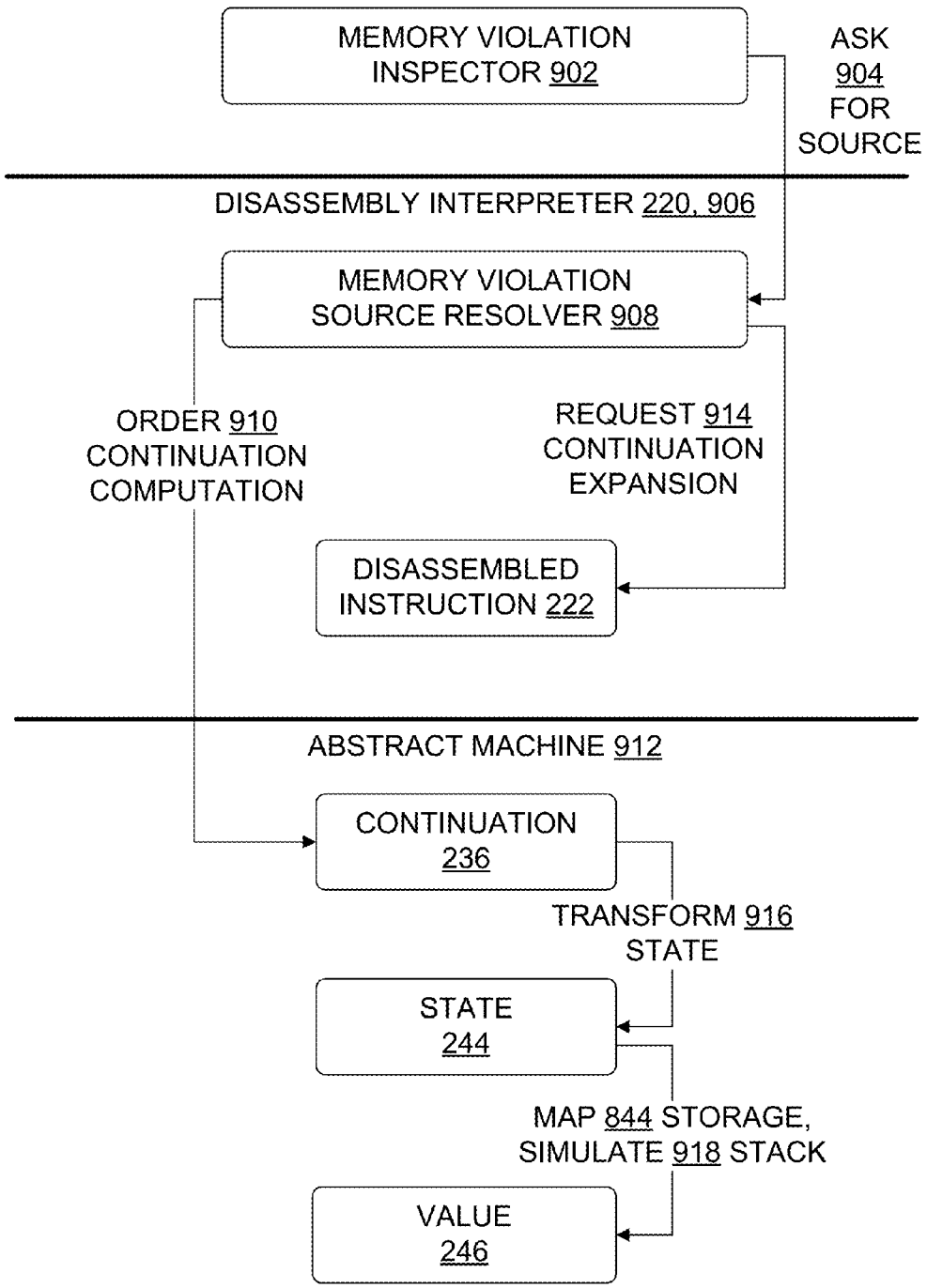
FIG. 9 is a data flow diagram illustrating aspects of one architecture implementing debugging without relying on source code.

The interpreter performs calculations on symbols, e.g., dereferencing "variable" with some offset can result in "variable→member". FIG. 9 illustrates one of many possible solution architectures. A memory violation inspector 902 serves as an entry point for the debugger into this enhancement. It also formats an output string 254 that holds the analysis result. The memory violation inspector 902 asks 904 a disassembly interpreter 220 for the source of the exception. The illustrated interpreter 220 is also denoted 906, to reflect the specific architecture shown in FIG. 9.

A memory violation source resolver 908 builds a disassembled instructions graph 252, and interprets 832 instructions to find a result 254. A graph 252 may be constructed by taking each instruction 222, analyzing control to identify which instructions could be executed after that instruction, and creating the graph 252 based on that information. Instructions 222 correspond to graph nodes, and there is an edge from node A to node B if and only if B can be executed right after A is executed.

After translating a sequence of assembly instructions (not necessarily the entire disassembly) into a continuation 236, the memory violation source resolver 908 orders 910 an abstract machine 912 to compute in a given initial state 244. A continuation 236 represents a computation and can be computed in a given state. That is, a continuation is a representation of the control state of a given piece of software. If a given continuation does not lead to the desired result 254, the memory violation source resolver 908 can request 914 expansion 842 of the continuation.

Within the abstract machine 912, the continuation is interpreted to transform 916 input state to output state, thus simulating computation encoded in the continuation. The state 244 and value 246 constructs know about symbol entries 212 and perform operations on them such as concatenation and adding a dereference indication. State 244 represents a state of a debuggee machine and keeps symbolic values, e.g., names 204. Value 246 allows symbolic calculation, and can be dereferenced or called in this implementation. As it proceeds, the abstract machine 912 maps 844 from registers and local storage slots to stored values and simulates 918 the stack 702.

Some Additional Combinations and Variations

Any of these combinations of code, data structures, logic, components, signals, signal timings, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the medium combinations and variants describe above.

Some embodiments get a disassembly after an exception, find an assembly instruction whose name is known, and build the full name from there by interpreting assembly instructions until they reach the exception point. Then they report the full name. Some start with a function call, and thus avoid building the control flow graph, making continuations, etc. Others do build the control flow graph, and then move backward through it from the exception point until they find an instruction whose symbolic name is known.

An example method #1 includes: obtaining 802 in a digital memory 112 a disassembly 210 of at least a portion of an executable code 122 after an incorrect storage access occurred 848 during execution 846 of the executable code, the disassembly including a sequence 256 of assembly instructions 222 which target a processor 110; locating 808 within the assembly instructions an instruction X, the instruction X including a storage location identifier 228 LOC_X, the storage location identifier LOC_X identifying a storage location 230 which has a symbolic name 204 SYM_X that is defined in terms of at least one entry 212 of a compiler-generated symbol collection 214; interpreting 832 one or more instructions within the disassembly forward from the instruction X through an instruction Y at which the incorrect storage access occurred, the instruction Y including a storage location identifier LOC_Y which has a symbolic name SYM_Y that is defined in terms of at least one entry of the compiler-generated symbol collection, the instruction Y being in a data flow 248 from instruction X; and reporting 838 SYM_Y in a debugging environment 100 as an apparent source 602 of the incorrect storage access.

An example method #2 includes method #1, wherein locating the instruction X includes locating 814 a first instruction of a function body 854 that includes instruction Y, and then using 816 the first instruction of the function body as the instruction X.

An example method #3 includes method #1, wherein locating instruction X comprises creating 810 a control flow graph 252 having nodes which correspond to instructions in the sequence of assembly instructions, and regressing 812 from instruction Y backward through the control flow graph to the instruction X.

An example method #4 includes method #1, wherein the name SYM_Y includes at least one of the following: a developer-defined function 408 name 204, a developer-defined variable 404 name 204, a developer-defined class 410 member 412 name 204, or a developer-defined array 406 member access.

An example method #5 includes method #1, wherein at least one of the following source-reliance-free conditions 302 is satisfied: (a) 304: the locating and interpreting are performed without using any mapping 306 between source code line numbers 308 and particular assembly instructions of the sequence; (b) 310: the locating and interpreting are performed in the absence of, and without use of, a source code 126 from which the executable code was generated; or (c) 312: the apparent source of the incorrect storage access is identified and reported by using the method instead of and without identifying the source of the incorrect storage access by performing a static analysis 314 of source code from which the executable code was generated.

An example method #6 includes method #1, wherein the name SYM_Y includes a name of a function and the method comprises finding 820 the name of the function by at least one of the following: (a) inferring 822 the name of the function from intermediate language code 824 corresponding to the executable code; or (b) using 826 an address 828 of a body of the function to find the name of the function in the compiler-generated symbol collection.

An example system #7 includes at least one debugging processor 110; a debugging memory 112 in operable communication with the debugging processor, the debugging memory also containing a disassembly 210 of at least a portion of an executable code 122, the disassembly including a sequence 256 of assembly instructions 222 which includes at least an instruction Y at which an exception occurred 848 during execution of the executable code by a debuggee processor 110, wherein the debugger processor in a given particular system and the debuggee processor may be the same processor or be different processors. The debugging memory also contains exception source identifier code 226 which upon execution by the debugging processor (a) locates 808 within the assembly instructions at least one candidate for an instruction X, the instruction X including a storage location identifier 228 LOC_X, the storage location identifier LOC_X identifying a storage location 230 which has a symbolic name 204 SYM_X that is defined in terms of at least one entry 212 of a compiler-generated symbol collection 214, (b) attempts 806 to track data flow 248 from the candidate for the instruction X through to the instruction Y at which the exception occurred, the instruction Y including a storage location identifier LOC_Y which has a symbolic name SYM_Y that is defined in terms of at least one entry of the compiler-generated symbol collection and is built up 836 from SYM_X during successful data flow tracking to instruction Y from one of the candidate(s) for instruction X, thereby confirming that candidate as the instruction X, and (c) reports 838 SYM_Y as an apparent source 602 of the exception.

An example system #8 includes system #7, wherein the debugging memory contains data accessible to the exception source identifier code which identifies (a) names 204, types 216, and storage locations 230 of variables 404 used in the executable code, (b) names 204 and return types 216 of functions 408 used in the executable code, and (c) names 204 and storage layouts 218 of classes 410 used in the executable code.

An example system #9 includes system #7, wherein the system includes a report 232 from the exception source identifier code reporting at least one of the following as human-readable code including SYM_Y 254 as an apparent source of the exception: a complex expression 604; chained method calls 606; or chained dereferences 608.

An example system #10 includes system #7, wherein the system includes a report 232 from the exception source identifier code reporting SYM_Y (254) as an apparent source of the exception, and wherein SYM_Y includes at least one of the following at the exception occurrence: a name 204 of a variable 404 that contained an invalid address; an expression 234 that was evaluated to an invalid address; a name 204 of a function 408 that returned an unexpected null pointer; a name 204 of a local variable 404 which contained an invalid pointer value; an expression 234 representing a series of consecutive class member dereferences which led to an invalid pointer value; a name 204 of a variable 404 that contained zero or an expression that was evaluated to zero; a name 204 of the method 408 that attempted to allocate memory; or a name 204 of a parameter that contained an invalid input value.

An example system #11 includes system #7, including a symbolic computation interpreter 220 in operable communication with a disassembler 224 and a debugger 128.

An example digital storage medium #12 contains and is configured by software 116, 118 which upon execution 846 by at least one processor 110 performs a method including: obtaining 802 a disassembly 210 of at least a portion of an executable code 122 after an exception 208 occurred 848 during execution 846 of the executable code, the disassembly including a sequence 256 of assembly instructions 222; interpreting 832 one or more instructions within the disassembly through an instruction Y at which the exception occurred, the instruction Y being an instruction to access a storage location 230 which has a symbolic name 204 SYM_Y that is defined in terms of at least two entries 212 of a compiler-generated symbol collection 214, the instruction Y being connected by a data flow 248 to an instruction X which is an instruction to access a storage location that has a symbolic name SYM_X which is a component of SYM_Y; and reporting 838 SYM_Y in a debugging environment 100 as an apparent source 602 of the exception.

An example digital storage medium #13 includes the digital storage medium #12 wherein the method includes translating 840 assembly instructions into a continuation 236, and expanding 842 the continuation until the instruction X is located.

An example digital storage medium #14 includes the digital storage medium #12 wherein the method includes mapping 844 from processor registers 240 and local storage slots 230 to symbolic names 204.

An example digital storage medium #15 includes the digital storage medium #12 wherein the interpreting 832 is optimized to support only frequently used assembly instructions 222, such that assembly instructions which correspond to five percent or less per capita of the executable code 122 are among instructions not recognized by the interpreting.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 8 through 10 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A method comprising:
obtaining in a digital memory a disassembly of at least a portion of an executable code after an incorrect storage access occurred during execution of the executable code, the disassembly including a sequence of assembly instructions which target a processor;

locating within the assembly instructions an instruction X, the instruction X including a storage location identifier LOC_X, the storage location identifier LOC_X identifying a storage location which has a symbolic name SYM_X that is defined in terms of at least one entry of a compiler-generated symbol collection;

interpreting one or more instructions within the disassembly forward from the instruction X through an instruction Y at which the incorrect storage access occurred, the instruction Y including a storage location identifier LOC_Y which has a symbolic name SYM_Y that is defined in terms of at least one entry of the compiler-generated symbol collection, the instruction Y being in a data flow from instruction X; and reporting SYM_Y in a debugging environment as an apparent source of the incorrect storage access.

2. The method of claim 1, wherein locating the instruction X comprises locating a first instruction of a function body that includes instruction Y, and then using the first instruction of the function body as the instruction X.

3. The method of claim 1, wherein locating instruction X comprises creating a control flow graph having nodes which correspond to instructions in the sequence of assembly instructions, and regressing from instruction Y backward through the control flow graph to the instruction X.

4. The method of claim 1, wherein the name SYM_Y includes at least one of the following: a developer-defined function name, a developer-defined variable name, a developer-defined class member name, or a developer-defined array member access.

5. The method of claim 1, wherein at least one of the following source-reliance-free conditions is satisfied:
(a) the locating and interpreting are performed without using any mapping between source code line numbers and particular assembly instructions of the sequence;
(b) the locating and interpreting are performed in the absence of, and without use of, a source code from which the executable code was generated; or
(c) the apparent source of the incorrect storage access is identified and reported by using the method instead of and without identifying the source of the incorrect storage access by performing a static analysis of source code from which the executable code was generated.

6. The method of claim 1, wherein the incorrect storage access resulted in an exception, and the instruction Y caused a processor to attempt at least one of the following during execution of the executable code: a memory access through a null pointer, a memory access outside an assigned address space, a division by zero, an operation which is undefined for the processor that is targeted by the assembly instructions.

7. The method of claim 1, wherein the name SYM_Y includes a name of a function and the method comprises finding the name of the function by at least one of the following:
(a) inferring the name of the function from intermediate language code corresponding to the executable code; or
(b) using an address of a body of the function to find the name of the function in the compiler-generated symbol collection.

8. A system comprising:
at least one debugging processor;
a debugging memory in operable communication with the debugging processor, the debugging memory also containing a disassembly of at least a portion of an executable code, the disassembly including a sequence of assembly instructions which includes at least an instruction Y at which an exception occurred during execution of the executable code by a debuggee processor, wherein the debugger processor in a given particular system and the debuggee processor may be the same processor or be different processors;

the debugging memory also containing exception source identifier code which upon execution by the debugging processor (a) locates within the assembly instructions at least one candidate for an instruction X, the instruction X including a storage location identifier LOC_X, the storage location identifier LOC_X identifying a storage location which has a symbolic name SYM_X that is defined in terms of at least one entry of a compiler-generated symbol collection, (b) attempts to track data flow from the candidate for the instruction X through to the instruction Y at which the exception occurred, the instruction Y including a storage location identifier LOC_Y which has a symbolic name SYM_Y that is defined in terms of at least one entry of the compiler-generated symbol collection and is built up from SYM_X during successful data flow tracking to instruction Y from one of the candidate(s) for instruction X, thereby confirming that candidate as the instruction X, and (c) reports SYM_Y as an apparent source of the exception.

9. The system of claim 8, wherein the debugging memory contains data accessible to the exception source identifier code which identifies (a) names, types, and storage locations of variables used in the executable code, (b) names and return types of functions used in the executable code, and (c) names and storage layouts of classes used in the executable code.

10. The system of claim 8, wherein the system comprises a report from the exception source identifier code reporting at least one of the following as human-readable code including SYM_Y as an apparent source of the exception:
a complex expression;
chained method calls; or
chained dereferences.

11. The system of claim 8, wherein the system comprises a report from the exception source identifier code reporting SYM_Y as an apparent source of the exception, and wherein SYM_Y includes at least one of the following at the exception occurrence:
a name of a variable that contained an invalid address;
an expression that was evaluated to an invalid address;
a name of a function that returned an unexpected null pointer;
a name of a local variable which contained an invalid pointer value;
an expression representing a series of consecutive class member dereferences which led to an invalid pointer value;
a name of a variable that contained zero or an expression that was evaluated to zero;
a name of the method that attempted to allocate memory; or
a name of a parameter that contained an invalid input value.

12. The system of claim 8, wherein the exception source identifier code comprises a continuation expander and a register-to-symbol mapping.

13. The system of claim 8, comprising a symbolic computation interpreter in operable communication with a disassembler and a debugger.

14. The system of claim 8, wherein the assembly instructions are in human-readable form.

15. A computer-readable storage medium containing and configured by software which upon execution by at least one processor performs a method comprising:

obtaining a disassembly of at least a portion of an executable code after an exception occurred during execution of the executable code, the disassembly including a sequence of assembly instructions;

interpreting one or more instructions within the disassembly through an instruction Y at which the exception occurred, the instruction Y being an instruction to access a storage location which has a symbolic name SYM_Y that is defined in terms of at least two entries of a compiler-generated symbol collection, the instruction Y being connected by a data flow to an instruction X which is an instruction to access a storage location that has a symbolic name SYM_X which is a component of SYM_Y; and reporting SYM_Y in a debugging environment as an apparent source of the exception.

16. The computer-readable storage medium of claim 15, wherein the method comprises translating assembly instructions into a continuation, and expanding the continuation until the instruction X is located.

17. The computer-readable storage medium of claim 15, wherein the method comprises mapping from processor registers and local storage slots to symbolic names.

18. The computer-readable storage medium of claim 15, wherein the method performs symbolic data flow analysis as opposed to operating solely on primitive data types.

19. The computer-readable storage medium of claim 15, wherein the interpreting is optimized to support only frequently used assembly instructions, such that assembly instructions which correspond to five percent or less per capita of the executable code are among instructions not recognized by the interpreting.

20. The computer-readable storage medium of claim 15, wherein SYM_X identifies a developer-defined variable or constant which is being read, and type information for a value of the variable or constant that is being read is indicated in the disassembly and/or in the compiler-generated symbol collection.

* * * * *